(12) United States Patent
Green et al.

(10) Patent No.: US 7,413,760 B2
(45) Date of Patent: Aug. 19, 2008

(54) PUFFED GRAIN FLAKE AND METHOD OF PREPARATION

(75) Inventors: Daniel R. Green, Minnetonka, MN (US); Nathan W. Lukecart, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 366 days.

(21) Appl. No.: 11/203,765

(22) Filed: Aug. 15, 2005

(65) Prior Publication Data

US 2007/0031575 A1 Feb. 8, 2007

(51) Int. Cl.
*A23L 1/164* (2006.01)
*A23P 1/12* (2006.01)
*A23P 1/14* (2006.01)

(52) U.S. Cl. .................. 426/620; 426/509; 426/516; 426/518; 426/621

(58) Field of Classification Search .............. 426/620, 426/621, 516, 518, 509
See application file for complete search history.

(56) References Cited

U.S. PATENT DOCUMENTS

| 5,338,556 | A | * | 8/1994 | Schwab et al. ............. 426/241 |
| 5,342,188 | A | | 8/1994 | Zimmermann |
| 5,413,805 | A | * | 5/1995 | Delpierre et al. ............ 426/620 |
| 5,997,934 | A | | 12/1999 | Geromini et al. |
| 6,149,965 | A | | 11/2000 | van Lengerich et al. |
| 6,291,008 | B1 | | 9/2001 | Robie |
| 2003/0185957 | A1 | * | 10/2003 | Gorski ....................... 426/560 |

* cited by examiner

*Primary Examiner*—Helen F Pratt
(74) *Attorney, Agent, or Firm*—John A. O'Toole; Douglas J. Taylor; Everett G. Diedriks

(57) ABSTRACT

Visually appealing heterogeneous puffed flaked Ready-to-Eat ("R-T-E") cereal products with varied texture and density have a first continuous denser portion and a second discontinuous portion in the form of more highly puffed discrete regions. The R-T-E cereal products are fabricated from a dried heterogeneous cooked cereal mass comprising a continuous phase provided by macerated cooked cereal ingredients, e.g., cut whole wheat and a discontinuous phase containing added discrete hydrated intact parboiled medium grain rice. The cereal products are made by preparation methods involving forming the workable heterogenous cooked cereal dough into wet pellets having discrete pieces of the parboiled rice; drying the wet pellets to form dried pellets; flaking the dried pellets to form wet flakes; and, heating the wet flakes to dry and puff the flakes to form puffed flakes having 2-5% moisture and bulk density of 270-480 g/liter. The flakes can be pre-sweetened.

20 Claims, 1 Drawing Sheet

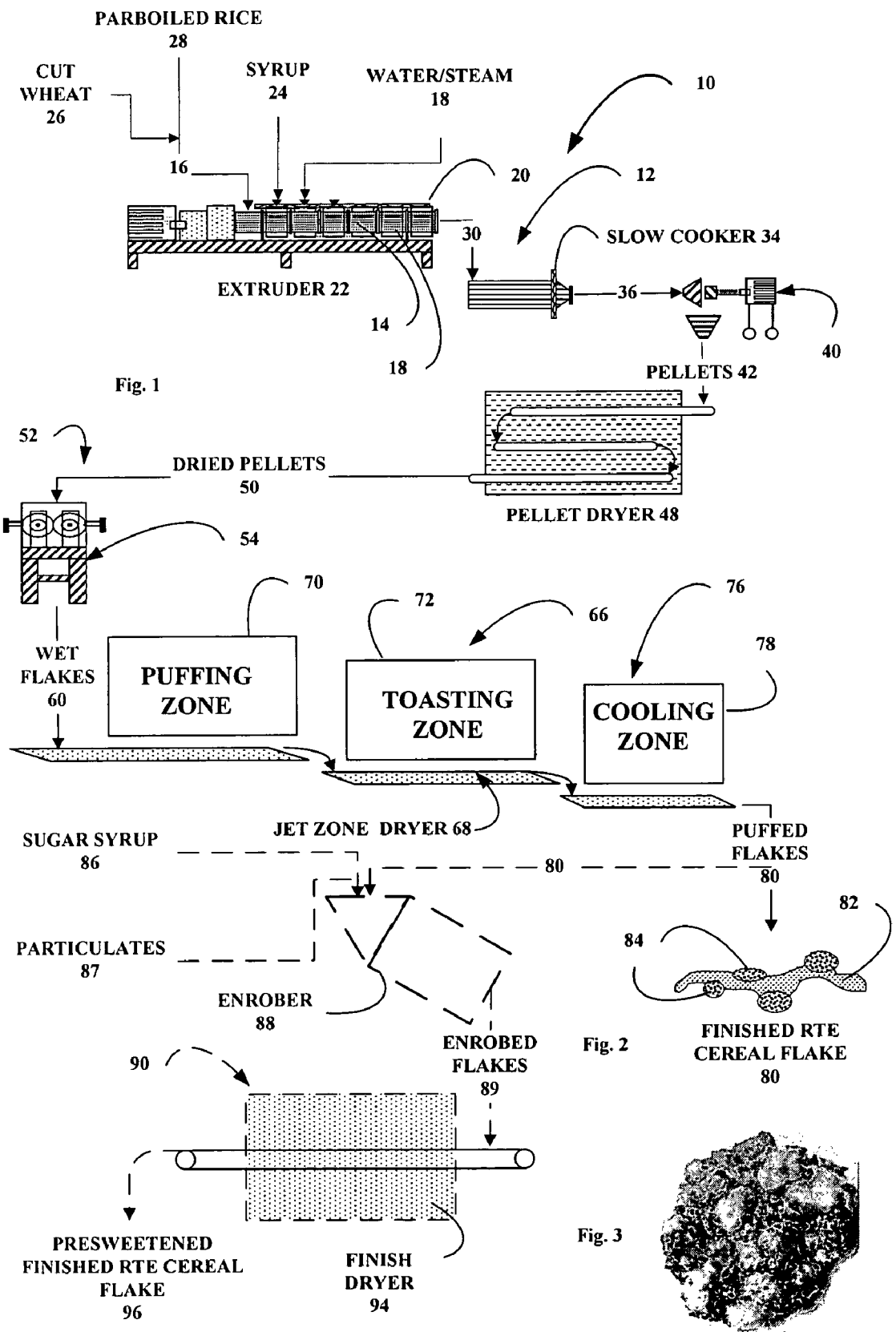

PUFFED GRAIN FLAKE AND METHOD OF PREPARATION

BACKGROUND OF THE INVENTION

The present invention relates to food products and to their methods of preparation. In particular, the present invention relates to food products prepared from a cooked cereal dough, especially ready-to-eat or breakfast cereals in flake form and to their methods of preparation.

A wide variety of food products are prepared from cooked cereal doughs especially ready-to-eat ("R-T-E") or breakfast cereals, as well as a variety of snack products. Generally in the preparation of the cooked cereal dough, cereal or farinaceous ingredients such as various cereal flours are first admixed with other dry ingredients such as salt, minerals, starch, sugars, to form a dry blend of ingredients and then is further blended with various liquid ingredients, including moisture and heated to gelatinize or cook the starch fraction of the cereal ingredients and other starchy materials. The gelatinized or cooked mass is then worked to form homogenous or well blended cooked cereal dough. A wide variety of blending cooking, working apparatus and techniques are well known. Also, known cooked cereal dough formulation and preparation methods include formulation and processing condition variations such as those intended to increase or minimize shear depending upon desired end product attributes and skilled artisan's beliefs of such variations and their interactions on end product attributes.

More recently, the preparation of a cooked cereal dough using a cooker extruder especially a twin screw extruder has become commonplace. The cooked cereal doughs so prepared can be processed to form finished products of various size, textures, and shapes. Typically, the post, cooked cereal dough formation step involves forming suitably sized and shaped individual pieces and drying to form finished cereal base pieces such as shreds, flakes, biscuits or puffs. Thereafter, the finished dried cereal base pieces can have a topical coating applied to provide desired taste and texture attributes. For example, in the preparation of a breakfast cereal, the topical coating can include a sugar coating. In other variations, such as for seasoned snack products, the topical coating can include salt alone or in combination with various seasoning blends.

The present invention is directed to improved flake type RTE cereal products. Typically, in the cooked cereal dough is first formed into pellets in a pelletizing step. The pellets are then dried or otherwise conditioned for flaking into thin wet flakes in a flaking or flake forming step. Thereafter, the wet thin flakes are finish dried and optionally toasted.

The present invention is particularly directed to formulating selected cereal ingredients and cooking to provide a particularly heterogeneous cooked cereal dough. The present invention further includes pelletizing the heterogeneous cooked cereal dough with minimal shear to form pellets than have maintained the heterogeneous nature of their cooked cereal dough. The novel pellets can then be flaked and then finish dried in a particular manner to provide the present improved puffed heterogeneous flaked RTE cereal products.

Surprisingly, it has been found that parboiled medium grain rice can be used as a key ingredient in the preparation of cooked cereal doughs and finished food products prepared there from. It has been more surprisingly been discovered that selection of medium grain parboiled rice and use without pr hydration can be conveniently used to prepare a desirable heterogeneous RTE cereal flake.

BRIEF SUMMARY OF THE INVENTION

The present invention provides cooked cereal compositions such as cooked cereal doughs comprising an added medium grain parboiled rice ingredient and further provides dried finished cereal food products fabricated there from such as ready-to-eat ("R-T-E") or breakfast cereals and grain based snacks.

The dried cereal finished products are fabricated from cooked cereal doughs that can comprise conventional cereal ingredients and about 10 to 60% of added or parboiled medium grain rice. The finished fortified cereal products are not only organoleptically desirable but almost exhibit surprising moderate levels of rancidification (under 1 ppm hex anal) even after six months of room temperature storage in conventional product packaging.

In its method aspect, the present invention resides in methods for preparing the present rice bran oil containing compositions and finished R-T-E products prepared there from. In one embodiment, the methods can comprise:

A. providing a cooked cereal dough or mass containing rice;
B. forming the cereal dough into pieces; and,
C. drying the cereal pieces to form the present grain based finished food products fortified with rice.

In another embodiment all or at least a portion of the rice bran oil is topically applied to the piece.

BRIEF DESCRIPTION OF THE DRAWINGS

FIG. 1 is a schematic process flow diagram of one embodiment of the methods of preparation of the present invention.

FIG. 2 is an enlarged pictorial representation of a cross section of a finished flake RTE cereal product of the present invention.

FIG. 3 is a plan view photograph of one embodiment of the finished heterogeneous flaked cereal products of the present invention.

DETAILED DESCRIPTION OF THE INVENTION

The present invention relates to cooked cereal doughs containing parboiled medium length rice, to finished dried flaked RTE cereal finished products prepared there from and to methods for their preparation. Each of these product constituents, as well as methods for their preparation and use are described in detail below. Throughout the specification and claims, percentages are by weight and temperatures in degrees Celsius, unless otherwise indicated. All referenced patents and patent application herein are hereby incorporated by reference.

Referring now to FIG. 1, there is seen a schematic flow diagram of the preferred embodiment of method of preparation generally designated by reference numeral 10. In the preferred embodiment, the present methods 10 can comprise a first step 12 of providing a cooked cereal composition such as a heterogeneous cooked cereal mass comprising a first continuous phase and a second discrete or discontinuous phase containing added hydrated intact parboiled medium grain rice within the herein specified ranges.

As is well known, a cooked cereal composition can be prepared by a first sub-step 14 of blending various dry cereal ingredients 16 together with water or steam 18 and cooking 18 to gelatinize the starchy components and to develop a cooked flavor to form a cooked cereal component 36. The cooked cereal material 36 can also be and step 12 can additionally comprise the sub-step 20 of mechanically working the cooked cereal ingredients. The cooking and mechanical work can occur simultaneously or sequentially such as in a twin screw extruder 22.

The dry ingredients can also include various minor ingredients (not shown) or additives such as sugar(s), salt and mineral salts, e.g., trisodium phosphate, and starches which can conveniently be pre-blended with the cereal ingredients 16. In addition to the water 18, various liquid ingredients such as corn (maize) or malt syrups 24 can be added.

In the preferred form, the cereal ingredients include a first principle cereal ingredient. In more preferred variations, the cereal grain ingredient is cut whole grain wheat 26 especially U.S. #2 grade soft white wheat including both Eastern and Western soft white wheats, which have been suitably and adequately cleaned. While white wheat is preferred, Red wheat can also be used in full or partial substitution. Whole wheat grain is cut such as by steel cutting into smaller sized pieces that are about 0.2-2 mm in size (e.g., approximately 10% retained on a U.S. Standard #8 screen.) such as by cutting or sectioning the grain into 2-4 fragments or pieces. In other variations, all or a portion of the whole grain cut wheat particles can be substituted with similarly sized particles of other whole grain particles supplied by any of the major cereal grains including, corn (maize), oats, barley, rye, rice, and mixtures thereof. The grain materials can also be supplied in whole or in part by such minor or "heritage" grains such as spelt, kamut, quinoa and mixtures thereof. While not produced in large quantities, such heritage grains are especially popular among those interested in organic foods. In less preferred variations, the cut grain pieces can be substituted with equivalent amounts or levels of other finer sized cereal ingredients such as cereal flours.

The cereal ingredients 16 include a parboiled medium grain rice ingredient 28. Parboiled rice is a well known commodity rice ingredient. Generally, parboiled rice is produced by a process or pre-treatment of soaking, pressure steaming and drying prior to milling. Unhulled rice is soaked or tempered in water to desired hydration levels and then steamed to gelatinize the starch (e.g., to achieve 90% to 95% gelatinization). The steamed rice is then dried to stable moisture contents (e.g., about 4-12% moisture). The hulls, bran and germ are then removed from the steamed and dried rice resulting in highly stable rice. Parboiling process not only modifies the starch and but also permits the retention of much of the natural vitamins and minerals in kernels even after husking and milling the rice to remove the bran. The finished parboiled (dried) rice ingredient is usually slightly yellowish, although the color largely fades after cooking.

Parboiled rice is used as an intact ingredient in a variety of food applications such as an ingredient in dry mixes for a flavored rice side dish or as a component of mixed grain side dishes but, it is believed, not used previously as an ingredient in the preparation of RTE cereals primarily due to the higher cost of parboiled rice (due to its pretreatment processing) compared to regular raw polished white rice (approximately double the cost). Parboiled rice is generally used in those consumer food products such as flavored rice side dishes where the added convenience of rapid cooking is desired and can justify the incremental cost of parboiled rice.

Parboiling rice is used to prepare rice that can be prepared from short grain, medium grain, long grain and even wild rice types. Importantly for use herein, however, the parboiled rice 28 herein is provided substantially completely by medium length rice rather than short or long rice varieties. While not wishing to be bound by the proposed theory, it is speculated herein that parboiled medium length rice is of the optimal size for realizing the end product attributes desired in the heterogeneous finished RTE cereal products herein. Also, the starch profile of amylose and amylopectin starches in medium grain rice is believed important herein in providing the puffed rice phase in the finished product herein. Also, long grain parboiled rice stays intact in the finished RTE cereal piece and does not expand well in the finished pieces. While other rice grain types (e.g., short length or long grain rice) can be added to the cereal ingredients, in the preferred embodiment at least a majority of the parboiled rice is supplied by medium length rice, and preferably at least 70%, and for best results, all the parboiled rice is supplied by medium length parboiled rice.

While a variety of suppliers both domestic and foreign can be used to supply the parboiled rice ingredient herein, a preferred supplier is Riviana Food Products Inc.

Thus, parboiled rice is to be distinguished from both brown rice and white or milled rice each of which can be supplied by medium length rice varieties. Brown rice is the husked but unmilled rice. It is high in nutritious and fiber, so brown rice is considered as a health food. Milled rice is the most common form of rice found in market. It has all husk and bran removed, leaving only the core of rice which is starch.

In the preferred form, the present medium length parboiled rice 28 has only a limited number of broken kernels. In rice milling, a fraction of the rice kernels can break during milling process. In certain commercial operations, those broken kernels can be taken out and packed separately as "broken rice". However, in the present invention, the percentage of broken rice is less than 10%, preferably less than 5% and the present parboiled rice ingredient is preferably characterized by less than 5% broken kernels.

The starchy cereal component(s) 16 can comprise from about 40 to 99% (dry basis) of the cooked cereal dough composition. Better results in terms of organoleptic attributes and reductions in R-T-E cereal piece frangibility are obtained when the cereal ingredient(s) comprises about 75 to 95% of the cooked cereal dough composition. For best results the cereal ingredients comprise about 80 to 95% of the present cereal products. Within this broad range for cereal ingredients (including the cut wheat and the parboiled rice), in one preferred embodiment the weight ratio of cut wheat (and/or other non-parboiled rice cereal ingredients) to parboiled rice can range from about 2:1 to about 1:2. In a more preferred form, the weight ratio of cut wheat 26 to parboiled rice 28 can be about 1:1.

The cooked cereal material 36 additionally comprises about 10 to 55% moisture 18. The amount of moisture depends, in part, upon the particular cereal ingredients, desired finished products, cooking equipment and techniques employed. The moisture includes the water contribution from the cereal ingredients themselves (which often are controlled to about 12-15% moisture), the moisture added with any syrup 24 component as well as the moisture added through steam or water per se addition. In a preferred embodiment, the moisture content of the cooked cereal mass ranges from about 20-30%, preferably about 22-28% before exiting the cooker.

If desired, the present cereal dough composition can additionally comprise about 0.1 to about 20% (dry weight) by weight sugar(s) or, synonymously herein, nutritive carbohydrate sweetening agents, preferably about 0.5% to 5%. Such materials are also well known in the R-T-E cereal art. Useful herein as the sugar component is sucrose. However, the sugar(s) component can additionally comprise conventional fructose, maltose, dextrose, honey, fruit juice solids, brown sugar, and the like. In addition to providing desirable sweetness, the sugar component additionally beneficially affects the cereal color and texture. Better results are obtained, especially for R-T-E cereal products, when the sugar(s) component comprises from about 1% to about 10% by weight of the composition.

Conveniently, the sweeteners can be added in the syrup 24. In a preferred form the syrup 24 can include:

| Ingredient | Weight % (of syrup) |
|---|---|
| Sucrose | 35-45% |
| malt syrup solids (dry weight basis) | 6-7% |
| Refiners sugar, | 6-7% |
| Trisodium phosphate | 0.1-0.5% |
| Salt | 3-5%% |
| Calcium carbonate | 1-4% |
| Vitamins | Trace |
| Color | Trace |
| Moisture | 40-45% |

If desired, the present cereal dough composition can additionally include a variety of materials designed to improve the aesthetic, organoleptic or nutritional qualities of the cereal. These adjuvant materials can include vitamin and/or mineral fortification, colors, flavors, high potency sweetener(s), and mixtures thereof. The precise ingredient concentration in the present cereal composition will vary in known manner. Generally, however, such materials can each comprise about 0.01% to about 2% dry weight of the cereal composition.

One especially useful material is common salt. Desirably, the salt comprises about 0.1 to 2%, preferably about 0.5 to 1.0% of the cereal composition.

Still another highly preferred ingredient is a malt syrup flavor ingredient. The malt syrup comprises about 1 to 8% (dry basis), preferably about 2 to 5%.

Fiber is believed to adversely affect selected mineral and vitamin absorption. Accordingly, in highly preferred embodiments, in particular, the present R-T-E cereals can be fortified with bioavailable sources of calcium, iron, riboflavin and the like. These mineral fortifiers can be incorporated into the cereal compositions directly. It is also desirable to vitamin fortify the present R-T-E cereals, especially selected B vitamins, e.g., riboflavin. Conventional methods and techniques of vitamin fortification can be used herein. Due in part to their heat sensitivity, vitamin fortification is typically practiced by topical application to the R-T-E cereal and such a technique is preferred herein.

The present raw cereal components and other ingredients can be cooked and worked to form the present cooked cereal doughs by conventional cooked cereal dough preparation methods. The total moisture addition is controlled to provide a cooked cereal comprising about 20 to 35% moisture, preferably about 25 to 35% moisture.

The parboiled rice ingredient 28 is added to the extruder 22 without any pre-treatment such as pre-hydration. In the present process, the hydration of the parboiled rice in the extruder is controlled to minimize hydration. Hydration of the parboiled rice ingredient 28 is important since increases in hydration of the parboiled rice 28 can result in softening of the rice kernels which in turn can lead to undesirable loss of piece integrity during the subsequent palletizing step and ultimately in the reduction of discernable rice piece in the finished product.

Likewise the cut wheat is preferably added directly to the twin screw extruder without any hydration (such as steeping) or pre-cooking step to as to minimize the viscosity of the cooked mash or gruel 30 exiting from the extruder so as to help maintain the piece identity of the parboiled rice.

In the preferred form, the twin screw extruder is equipped with a screw configuration to minimize imparting shear to the cooked cereal mixture. In one preferred form, the preparation of the cooked cereal component is practices such as to impart very low levels of shear, namely, less than about 30 W-ht/kg., preferably less than about 15 W-hr/kg. of Specific Mechanical Energy ("SME").

The ranges of specific mechanical energy provided below in the context of extrusion can also provide guidance with respect to the high shear mixing since delivery of similar amounts of mechanical energy with a mixer should provide similar results as with delivery with an extruder. In general, the high shear mixing is performed for about 30-180 seconds, preferably about 1 minute. A person or ordinary skill in the art will recognize that additional ranges of rpm and mixing times within the explicit ranges above are contemplated and are within the present disclosure.

Multiple screw extruders, e.g., twin screw extruders, are particularly desirable since they are particularly suitable for the control of shear. Suitable cooking extruders are available for food products, such as Buhler extruders from the Buhler Group, Switzerland and extruders from Werner & Pfleider Inc.

To apply high shear, a twin-screw extruder can be operated at least at 100 rpm, in further embodiments from 125 rpm to 10,000 rpm and in additional embodiments from about 150 rpm to about 5,000. As is well know in the food processing art, with either a mixer or an extruder, the amount or degree of shear can be characterized or described in terms of the Specific Mechanical Energy ("SME"). The Specific Mechanical energy is a measure of the mechanical energy or work that the extruder imparts to the material on a unit weight basis. Generally, the high shear method herein involves the application of from about 5 to about 25 W-hr/kg, in further embodiments from about 10 to about 20 W-hr/kg and in additional embodiments from about 10 to about 15 W-hr/kg material.

With respect to a twin-screw extruder, the energy imparted to the material in the extruder is referred to as specific mechanical energy expressed in units of energy/weight ("W-hr./kg"), which drives the cooking method within the extruder. The specific mechanical energy is the delivered mechanical shaft power divided by the total feed rate, i.e.:

SME=(delivered mechanical or shaft power)/total feed rate

The total feed rate is the total weight per unit time of all solid and liquid feeds, which can be expressed as kilograms per hour. The delivered power is the difference between the power delivered with the load minus the power delivered with no load. For an extruder powered with an ac motor, the power generally can be read directly from the motor drive in Watts. For an extruder powered with a DC motor, the delivered mechanical shaft power can be evaluated using the following equation:

delivered mechanical power=[(volts)(amps)]$_{load}$−
[(volts)(amps)]$_{no\ load}$     (2)

To evaluate the no load power, the screws and shafts of the extruder can be removed, and a curve generated of the [(volts) (amps)]$_{no\ load}$ versus rotational speed. The value of [(volts) (amps)]$_{no\ load}$ at the actual screw speed can be used for the calculation. The armature voltage and current can be obtained from the DC motor drive. These calculations can be similarly adapted for other high shear apparatuses, such as a single-screw extruder, a three-screw extruder, a high shear mixer and the like.

The use of an extruder has the advantage of being a continuous process. The use of a continuous process can have advantages with respect to processing of large volumes as well as lowering costs for larger volume production. Also, it has been found that a continuous process may improve the heterogeneous texture and appearance of the resulting product. The cooked cereal material 30 upon exiting the extruder 22 exhibits a consistency of a thin watery gruel or mash wherein the cut wheat has been at least partially gelatinized.

Thereafter, the cooking step 12 can further include a sub-step of maintaining the cooked cereal material 30 at elevated pressures and temperatures for time sufficient to complete gelatinization of the starch component of the cut wheat ingredient and to hydrate the parboiled rice 26 while imparting minimal shear. This sub-step has the effect of extending the cooking time of the cook step 12 beyond that experienced in the extruder 22 not only to gelatinize more of the starch in the cut wheat but also to develop desirable cooked cereal flavor. Conveniently, the extending cooking or holding sub-step can be practiced in an elongated pressurized vessel 34 equipped with a slowly revolving Archimedes screw. Such pressurized low shear cooking vessels are well known (See, for example U.S. Pat. No. 5,997,934 "Manufacture of Cooked Cereals" issued Dec. 7, 1999 to Geromini et al., U.S. Pat. No. 6,291,008 "R-T-E Cereal and Method of Preparation" issued Sep. 18, 2001 to Robie et al., or U.S. Pat. No. 6,746,702 Method of Preparing a Snack Product From a Cooked Cereal Dough" issued Jun. 8, 2004 to Robie) and the skilled artisan will have no difficulty in selecting apparatus useful for practicing the holding sub-step herein.

Good results are obtained when the temperature within vessel 34 ranges from about 115-135° C. (240-275° F.), preferably about 120-125° C. (248-257° F.). Operating pressures within the extended cooking vessel can range from about 3000-4000 kilopascals ("kPA.") (435-580 PSI), preferably about 3200-3600 kPA. (465-522 PSI) and for best results about 3300-3500 kPa. (480-510 PSI). Residence times within the extended cooking vessel 34 can range from about 5-30 minutes, preferably about 5-15 minutes and for best results about 10-15 minutes.

Upon exiting the cooking vessel and depressurization to atmospheric pressure, the cooked cereal component 36 cools to about 100° C. The amount of moisture release upon depressurization is typically about 1-5% as moisture flashes off. In more preferred embodiments, the moisture content of the cooked cereal component 36 after such moisture flashing ranges from about 22-28%. As a result of the extended cooking sub-step, the moisture has migrated from the gruel 30 into the parboiled rice to hydrate the rice. Since the rice starch in the parboiled rice is gelatinized by the parboiling process, the starch within the parboiled rice pieces is also gelatinized or cooked even though the rice has been merely hydrated during the extended holding sub-step. Consequently, the cooked cereal material 36 can be described as a workable dough (i.e., can be formed into pieces that can retain their shape such as pellets as described below). Due to the low shear within the cooking vessel 34, the now hydrated parboiled rice is still in the form of discrete discernable individual pieces within the cooked cereal dough 36. That is, the rice has not been macerated but remains in the form of intact pieces. However, there is some reduction in the size of the rice ingredient. Roughly described, the rice pieces are cut in half.

Since the cooked cereal component 36 experiences minimal shear, the bowl life of the finished RTE cereal product is very good. Also, the starch component of the cooked cereal component 36 has minimal starch degradation due to high shear which helps bowl life. Moreover, due to the brevity of the extrusion cooking, the parboiled rice ingredient 28 is minimally hydrated.

The present methods 10 further can comprise the step 40 of forming the parboiled rice bearing cooked cereal dough 36 into individually shaped and sized "wet" pellets 42 having discrete pieces of the parboiled rice. Conventional techniques and equipment can be employed to practice this step and the skilled artisan will have no difficulty in selecting those suitable for use herein. In preferred form, low shear pellet forming apparatus 41 and techniques are used to practice the pellet forming step to limit the size reduction of the rice component.

In a preferred embodiment, the pellet forming step 40 is practiced to provide disk shaped pellets 42 about 10 mm (⅜ inch) in diameter and about 12-13 mm (½ inch) in length. Such sizing results in pellets 42 having pellet counts ranging, in preferred form, from about 25-30/10 g (wet basis); or about 3 pellets/g. Adjustments in either the length or diameter of the wet pellets 42 can be practiced and such adjustments can affect the size and number of discernable rice pieces or fragments. Consequently, the pellet forming step 40 can be used and practiced to adjust or control the size and number distribution of the rice particles in the pellets and thereby in the resulting finished product as desired. In the preferred form, the pellets 42 each have rice fragments typically ranging in size from about 1 to 2 mm in diameter and about 6 to 14 to in number.

Thereafter, the present methods 10 can include a step 46 of drying the "wet" pellets 42 from their initial moisture contents of about 22-28% to form parboiled rice fragment bearing dried pellets 50. The pellet drying step 46 can be practiced to provide dried pellets 50 having moisture contents ranging from about 15%-20%, preferably about 17%-19%. If the pellets are dried excessively, then the resultant dried pellets can be too hard and can shred or shatter during the subsequent flaking step.

The pellet drying step 46 can be practiced in a conventional pellet dryer 48 such as the three pass pellet dryer depicted. Such three pass dryers have an upper endless conveyor that receives the wet pellets 42 and advances them through the dryer. The partially dried pellets then fall upon a second dryer disposed there below advancing in reverse direction whereby the pellets are further dried. Finally, the pellets fall upon a third conveyor to complete the drying step forming the dried pellets 50. The dryer 48 can be a forced hot air type operated at air temperatures ranging, for example, from about 50-70° C. Typical residence times within the dryer 48 can range from about 20-30 minutes. In other variation, a single pass dryer can also be used although such dryers are less preferred due to their larger footprint within a commercial production facility.

The present methods 10 can additionally include a step 54 of flaking the parboiled rice fragment bearing dried pellets 50 to form "wet" flakes 60. The flaking step 54 can be conveniently practiced in a conventional flaking rolls 52. In a preferred form, the flakes so formed have a thickness ranging from about 750-1000 micrometers ("μm") (≈0.035-0.040 inch)

Step 54 can additionally include a sub-step (not shown) of heating the pellets 50 immediately prior to flaking such as with a radiant heater to soften or plasticize the pellets. Such pre-heating of the pellets can provide desirable increases in the degree and extent of curling in the finished RTE cereal. Generally, increased heating directionally results in greater finished flake curling. In preferred form, the pellets 50 are preheated to about 85-95° C. immediately before flaking.

In a preferred variation, the present invention avoids any step of pellet tempering before flaking or toasting. In the prior art preparation of puffed rice products, such a pellet tempering step is desirable before toasting to allow for starch retrogradation to allow for proper puffing in the finish drying and puffing steps. However, such tempering induced starch retrogradation is unnecessary in the present product production methods and is preferably avoided herein since such tempering, whether pellet tempering or flake tempering, inhibits desirable flake curling in the finished product.

In other less preferred embodiments, the present the parboiled rice fragment bearing cereal compositions can be fabricated into a variety of common R-T-E cereal forms including, nuggets, or such planar forms including squares, or larger sized chips e.g., for snack pieces. For example, the parboiled rice fragment bearing dough 36 can be sheeted to form sheets of dough (e.g., 25 to 800 microns in thickness) than are then sliced to form ribbons and individual pieces formed by cutting the ribbons into individual pieces or by stamping out planar shaped pieces from the dough sheet especially in squares.

In still another variation, the cooked cereal dough can be fed to a biscuit forming device (see, for example, U.S. Pat. No. 5,342,188, entitled "Device For Crimping and Cutting Dough Ropes, issued Aug. 30, 1994 to C. E. Zimmermann, which is incorporated herein by reference) which forms the dough into biscuit shaped individual pieces.

The present methods 10 further comprise the step 66 of drying the wet flakes 60 to form finished cereal flake products. The skilled artisan will appreciate that practicing the drying step 66 depends in important part upon the desired end product. For example, for end products in the form of puffed flake RTE cereal products, the drying step 66 can be practiced in one or more sub-steps such as in a jet-zone fluid bed dryer 68. The dryer 66 can include a first or drying and puffing zone 70. Step 66 can include a sub-step of drying and puffing the wet flakes to form puffed flakes. In the upstream or first portion of zone 70, the wet flakes are pre-dried from a, 15-20%, preferably 16-18% moisture range to about 13-15%. Typical air temperatures range from about 120-135° C. (250-275° F.). The residence time in the first pre-drying section of heating zone 70 is about 15-25 seconds. The pre-dried flakes then advance into the second or puffing section of heating zone 70 for about an additional 15-25 seconds conveniently with puffing zone air temperatures at about 240-260° C. (465-500° F.) wherein the rice fragments puff or expand due to the intense heating to form the puffed or expanded RTE cereal flakes. Then, the puffed flakes advance into a toasting zone 72 and the drying step 66 can additionally include a toasting sub-step 74. The toasting sub-step 74 can be practiced at about 125° C. (255° F.) for about 10-30 seconds to toast the puffed flakes. The puffed and toasted flakes are dried to about 6-7% moisture. Then, drying step 66 can include a cooling sub-step 76 to cool the flakes to form a finished product 80 having a finish moisture content of about 2-5%. Conveniently, the dryer 66 can include a third or cooling zone 78 operated at about 21-32° C. (70-90° F.) to arrest the toasting and to bring the toasted and puffed flakes to near ambient temperatures.

Referring now briefly to FIG. 2, it can be seen that the finished RTE cereal flakes 80 are heterogeneous in nature and include a first continuous portion or phase 82 composed mainly from the cut wheat (or other macerated cereal grain). The whole wheat dough continuous portion 82 has a density ranging from about 0.6-0.8 g/cc, preferably about 0.7 g/cc. Flakes 80 additionally include a discontinuous portion 84 provided by discrete fragments of the parboiled rice ingredient. These puffed rice portions have a much lighter density typically ranging from about 0.1-0.3 g/cc., preferably about 0.3 g/cc. Also, the flakes are visually distinct in that the wheat continuous phase 82 has a deeper color than the lighter puffed rice fragments 84. The flake thickness is also highly variable across individual pieces due to the heterogeneous nature of the flake and can range from about 0.1 to about 2 mm. Moreover, the flakes 80 generally each have at least some degree of curl rather than being highly planar. As a result, a quantity of such flakes will have a bulk density ranging from about 270-480 g/liter (170-300 g/100$^3$ inch), preferably about 350 g/liter (220 g/100$^3$ inch). The flakes 80 also exhibit a delightful eating quality due to the blend of texture from the denser or harder portions and the combined light and more frangible puffed rice portions. As described above, the weight ratio of continuous portion to discrete portions can range from about 2:1 to about 1:2.

Referring once again to the schematic flow diagram of FIG. 1, the cereal pieces 80 can optionally be provided with a topical coating such as a pre-sweetener or sugar coating. In one variation, typically referred to as a wet sugar coating process, the process can include the step 90 of applying a concentrated liquid sugar syrup 86 to the dried flake cereal pieces 80 to form sugar coated or enrobed pieces 89. In commercial practice a quantity of dried flakes 80 or base in charged to an enrober 88 along with a quantity of the sweetener syrup 86. In certain variations of this embodiment, a portion or preferably all of the sugar is replaced with an equivalent level of low conversion maltose (see, for example U.S. Ser. No. 60/565,473 "Low Sugar Presweetened Coated Cereals and Method of Preparation" filed Apr. 26, 2004) or other nutritive carbohydrate sweetening ingredients. In still other variations, all or a portion of the sugar(s) or nutritive carbohydrate sweetening ingredients can be replaced with non nutritive sweeteners such non-nutritive sweeteners: aspartame, saccharin, acesulfame K, sucralose, neotame, and mixtures thereof. Preferred for use herein for a non nutritive sweetener is sucralose. In other variations, the topical coating can include a soluble fiber component especially inulin. An advantage to use of inulin is that inulin mimics the physical properties of sugars in cereal coatings and thus is easy to apply to finished cereal products. (See, for example, U.S. Pat. No. 6,149,965 "Cereal Products with Inulin and Methods of Preparation" issued Nov. 21, 2000 to Larson). In other variations, an insoluble fiber ingredient, e.g., wheat, corn and/or rice bran), can be topically applied to increase the fiber content of the finished products.

If desired, the present cereal compositions can be fabricated into presweetened R-T-E cereals such as by the topical application of a conventional sweetener coating. Both conventional sugar coatings and coatings employing high potency sweeteners, especially aspartame and potassium acesulfame, are known and can be used to provide presweetened cereals for use herein.

In other variations, an oil topical coating optionally with salt and/or flavors is applied to form finished dried snack products.

If employed, the topical sweetening is applied in sufficient amounts such that after drying to remove added moisture associated with the sugar coating solution, the sugar coating is present in a weight ratio of sugar coating to cereal base of about 1:100 to about 50:100, preferably 5:100 to about 40:100. Typically, the sugar coating solution will have a blend of sugars and will comprise about 4 to 20% moisture.

In still another variation, the topical coating can additionally include particulates 87 to provide added visual appeal. For example, the particulates can include small milled oat flakes ("baby" oat flakes). Or instant rolled oat flakes. As is well known such instant oat flakes can be provided by flaking steamed steel cut oat groats from sound clean hulled white oats. Generally, such oat flakes have the following size:

| | | |
|---|---|---|
| Retained on #4 U.D. Standard Size | 0% | Sieve opening: 4.76 mm |
| Retained on #8 U.S. Standard Size | 45-65% | Sieve opening: 2.36 mm |
| Through a #12 U.S. Standard Size | 9% maximum | Sieve opening: 1.68 mm |

The present methods can further include a finish drying step 92 to remove the moisture added by or with the sweetener syrup 86 to provide finished dried products having a moisture content of about 1 to 5% to form presweetened R-T-E finished cereal pieces 96. Finish dryer 94

The finished dried R-T-E cereal can be packaged and distributed in conventional form While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed:

1. An R-T-E flaked cereal, comprising;
  A. about 85 to 99.9% (dry weight) of a cooked cereal dough comprising a parboiled medium grain rice and a second cereal ingredient in a weight ratio of parboiled medium grain rice to second cereal ingredient ranging from about 1:2 to about 2:1 and wherein the cooked cereal dough is heterogeneous having a first discrete dispersed portion defined by discernible individual pieces provided by the parboiled medium grain rice and a second continuous portion provided by the second cereal ingredient and;
  B. about 2% to 5% moisture.

2. The R-T-E flaked cereal of claim 1 having a thickness ranging from about 750-1000 micrometers ("μm") (0.035-0.040 inch).

3. The R-T-E flaked cereal of claim 2 having flake count ranging from about 2-5/g.

4. The R-T-E flaked cereal of claim 3 wherein the dough continuous portion has a density ranging from about 0.6-0.8 g/cc.

5. The R-T-E flaked cereal of claim 3 wherein the dough rice portion is puffed to provide a puffed rice portion having a density of about 0.1-0.3 g/cc.

6. The R-T-E flaked cereal of claim 5 wherein the flakes are curled.

7. The R-T-E flaked cereal of claim 5 wherein a quantity of flakes have a hulk density ranging from about 270-480 g/liter (170-300 g/100$^3$inch).

8. The R-T-E cereal of claim 7 additionally comprising a topical sugar coating.

9. The R-T-E flaked cereal of claim 6 wherein weight ratio of parboiled medium grain rice to second cereal ingredient is about 1:1.

10. A method for preparing a puffed flaked product, comprising the steps of:
  A. providing a workable heterogonous cooked cereal dough having a first discontinuous portion provided by hydrated kernels of parboiled medium length rice and a second continuous phase provided by macerated cooked cereal ingredients and having a moisture content ranging from about 10-55%;
  B. forming the workable heterogonous cooked cereal dough into individually shaped and sized wet pellets having discrete pieces of the parboiled rice; and,
  C. drying the wet pellets from their initial moisture contents to about 15-20% moisture to form parboiled rice fragment bearing dried pellets;
  D. flaking the dried pellets to form wet flakes having discrete pieces of parboiled rice; and,
  E. heating the wet flakes to dry to about 2 to 5% moisture and to puff the flakes to form puffed and dried flakes having bulk density ranging from about 270-480 g/liter.

11. The method of claim 10 wherein step A includes a first sub-step of blending dry cereal ingredients together with water or steam and cooking to gelatinize the starchy components and to develop a cooked flavor to form a cooked cereal component and working the cooked cereal component into a cooked cereal dough in a cooker extruder at a temperature sufficient to gelatinize cereal starch in the grain pieces to provide an at least partially cooked cereal dough having discernible parboiled medium rice; and immediately thereafter, subjecting the cooked cereal dough to a second cooking step at a temperature of about 120 to 194° C.(248 to 380° F.) for about 15 to 45 minutes to form an extended time cooked cereal dough having said discernible rice grain pieces dispersed therein.

12. The method of claim 11 wherein step A is practiced to provide a low shear cooked cereal dough having an SME ranging from about 5 to about 25 W-hr/kg.

13. The method of claim 12 wherein in step B the cereal dough has a moisture content of about 22-28% and the rice is hydrated.

14. The method of claim 13 wherein step B is practiced to provided disk shaped pellets 42 about 10 mm (⅜ inch) in diameter and about 12-13 mm (½ inch) in length having pellet counts ranging from about 25-30/10 g (wet basis).

15. The method of claim 14 wherein in step B, the pellets each have rice fragments typically ranging in size from about 1 to 2 mm in diameter and about 6 to 14 in number.

16. The method of claim 15 wherein the flaking step is practiced to provide wet flakes having a thickness ranging from about 750-1000 micrometers ("μm") (≈0.035-0.040 inch).

17. The method of claim 16 wherein the flaking step is practiced to include preheating the pellets to about 85-95° C. immediately before flaking.

18. The method of claim 15 wherein step E is practiced in a jet zone dryer having a first puffing zone, a second toasting zone and a third cooling zone.

19. The method of claim 18 additionally including the step of applying a topical sweetener coating.

20. The method of claim 18 wherein the cooked cereal dough includes whole wheat.

* * * * *